US011665658B1

(12) United States Patent
Sorsby et al.

(10) Patent No.: US 11,665,658 B1
(45) Date of Patent: May 30, 2023

(54) SYSTEM AND METHOD FOR APPLICATION OF DOPPLER CORRECTIONS FOR TIME SYNCHRONIZED TRANSMITTER AND RECEIVER

(71) Applicant: Rockwell Collins, Inc., Cedar Rapids, IA (US)

(72) Inventors: William B. Sorsby, Cedar Rapids, IA (US); Eric J. Loren, North Liberty, IA (US); Tj T. Kwon, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/534,061

(22) Filed: Nov. 23, 2021

(51) Int. Cl.
H04W 56/00 (2009.01)
(52) U.S. Cl.
CPC ..... H04W 56/0035 (2013.01); H04W 56/005 (2013.01); H04W 56/0015 (2013.01)
(58) Field of Classification Search
CPC ......... H04W 56/0035; H04W 56/0015; H04W 56/005
See application file for complete search history.

(56) References Cited

U.S. PATENT DOCUMENTS

| 4,134,113 A | 1/1979 | Powell |
| 4,399,531 A | 8/1983 | Grande et al. |
| 4,806,934 A | 2/1989 | Magoon |
| 5,835,482 A | 11/1998 | Allen |
| 6,072,425 A | 6/2000 | Vopat |
| 6,115,394 A | 9/2000 | Balachandran et al. |
| 6,195,403 B1 | 2/2001 | Anderson et al. |
| 6,496,940 B1 | 12/2002 | Horst et al. |
| 6,662,229 B2 | 12/2003 | Passman et al. |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,299,013 B2 | 11/2007 | Rotta et al. |

(Continued)

FOREIGN PATENT DOCUMENTS

| CN | 101330448 A | 12/2008 |
| CN | 101465793 A | 6/2009 |
| CN | 101330448 B | 12/2010 |
| CN | 101465793 B | 2/2011 |
| CN | 101686179 B | 1/2013 |

(Continued)

OTHER PUBLICATIONS

Martorella, M. et al., Ground Moving Target Imaging via SDAP-ISAR Processing: Review and New Trends. Sensors 2021, 21, 2391. https://doi.org/10.3390/s21072391.

(Continued)

Primary Examiner — Dominic E Rego
(74) Attorney, Agent, or Firm — Suiter Swantz pc llo

(57) ABSTRACT

A system may include a transmitter node and a receiver node. Each node may include a communications interface including at least one antenna element and a controller operatively coupled to the communications interface, the controller including one or more processors. Each node may be time synchronized to apply Doppler corrections to said node's own motions relative to a stationary common inertial reference frame. The stationary common inertial reference frame may be known to the transmitter node and the receiver node prior to the transmitter node transmitting signals to the receiver node and prior to the receiver node receiving the signals from the transmitter node.

15 Claims, 12 Drawing Sheets

(56) References Cited

U.S. PATENT DOCUMENTS

| | | |
|---|---|---|
| 7,417,948 B2 | 8/2008 | Sjoblom |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,036,224 B2 | 10/2011 | Axelsson et al. |
| 8,159,954 B2 | 4/2012 | Larsson et al. |
| 8,218,550 B2 | 7/2012 | Axelsson et al. |
| 8,223,660 B2 | 7/2012 | Allan et al. |
| 8,341,289 B2 | 12/2012 | Hellhake et al. |
| 8,490,175 B2 | 7/2013 | Barton et al. |
| 8,553,560 B2 | 10/2013 | Axelsson et al. |
| 8,630,291 B2 | 1/2014 | Shaffer et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,867,427 B2 | 10/2014 | Taori et al. |
| 8,913,543 B2 | 12/2014 | Zainaldin |
| 8,942,197 B2 | 1/2015 | Rudnick et al. |
| 8,964,739 B1 | 2/2015 | Wisehart |
| 9,179,475 B2 | 11/2015 | Koleszar et al. |
| 9,246,795 B2 | 1/2016 | Madaiah et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,435,884 B2 | 9/2016 | Inoue |
| 9,516,513 B2 | 12/2016 | Saegrov et al. |
| 9,544,162 B2 | 1/2017 | Masseur et al. |
| 9,628,285 B2 | 4/2017 | Császár |
| 9,713,061 B2 | 7/2017 | Ruiz et al. |
| 9,858,822 B1 | 1/2018 | Gentry |
| 9,979,635 B2 | 5/2018 | Hellhake et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,257,655 B2 | 4/2019 | Cody |
| 10,382,897 B1 | 8/2019 | Lanes et al. |
| 10,455,521 B2 | 10/2019 | Hudson et al. |
| 10,484,837 B2 | 11/2019 | Navalekar et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,785,672 B2 | 9/2020 | Kwan et al. |
| 10,798,053 B2 | 10/2020 | Nolan et al. |
| 10,873,429 B1 | 12/2020 | Kwon et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,082,324 B2 | 8/2021 | Ramanathan et al. |
| 11,129,078 B2 | 9/2021 | Yates et al. |
| 11,290,942 B2 | 3/2022 | Kwon et al. |
| 11,528,675 B2 * | 12/2022 | Nagaraja ........... H04W 72/0406 |
| 2002/0018448 A1 | 2/2002 | Amis et al. |
| 2003/0151513 A1 | 8/2003 | Herrmann et al. |
| 2004/0028016 A1 | 2/2004 | Billhartz |
| 2004/0213239 A1 | 10/2004 | Lin et al. |
| 2004/0246902 A1 | 12/2004 | Weinstein et al. |
| 2006/0010170 A1 | 1/2006 | Lashley et al. |
| 2006/0056421 A1 | 3/2006 | Zaki |
| 2007/0097880 A1 | 5/2007 | Rajsic |
| 2007/0109979 A1 | 5/2007 | Fu et al. |
| 2007/0223497 A1 | 9/2007 | Elson et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0219204 A1 | 9/2008 | Lee et al. |
| 2008/0273582 A1* | 11/2008 | Gaal ................ H04L 25/0226 375/224 |
| 2008/0291945 A1* | 11/2008 | Luo ...................... H04J 11/0069 370/509 |
| 2008/0310325 A1 | 12/2008 | Yang |
| 2009/0086713 A1* | 4/2009 | Luo ...................... H04L 27/2655 370/350 |
| 2009/0290572 A1 | 11/2009 | Gonia et al. |
| 2010/0074101 A1 | 3/2010 | Skalecki et al. |
| 2010/0074141 A1 | 3/2010 | Nguyen |
| 2011/0006913 A1 | 1/2011 | Chen et al. |
| 2011/0013487 A1 | 1/2011 | Zhou et al. |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2013/0006834 A1 | 1/2013 | Waelbroeck et al. |
| 2013/0069834 A1 | 3/2013 | Duerksen |
| 2013/0100942 A1 | 4/2013 | Rudnick et al. |
| 2013/0195017 A1 | 8/2013 | Jamadagni et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2015/0010153 A1 | 1/2015 | Robertson |
| 2015/0222479 A1 | 8/2015 | Kim et al. |
| 2015/0296335 A1 | 10/2015 | Joshi et al. |
| 2015/0326689 A1 | 11/2015 | Leppanen et al. |
| 2016/0139241 A1 | 5/2016 | Holz et al. |
| 2016/0150465 A1 | 5/2016 | Jung et al. |
| 2016/0189381 A1 | 6/2016 | Rhoads |
| 2016/0373997 A1 | 12/2016 | Petersen et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1* | 10/2019 | Schroder ................ G01S 13/325 |
| 2019/0349172 A1* | 11/2019 | Zhang ................ H04L 5/0094 |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0396708 A1* | 12/2020 | Bharadwaj ........ H04W 56/0015 |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2022/0086818 A1* | 3/2022 | Nam ................ H04W 72/046 |
| 2022/0094634 A1 | 3/2022 | Kwon et al. |
| 2022/0143428 A1 | 5/2022 | Goetz et al. |
| 2022/0198351 A1 | 6/2022 | Beaurepaire et al. |
| 2023/0057666 A1 | 2/2023 | Kwon et al. |

FOREIGN PATENT DOCUMENTS

| | | |
|---|---|---|
| CN | 103067286 B | 6/2016 |
| CN | 107645417 A | 1/2018 |
| CN | 110234147 A | 9/2019 |
| DE | 102010010935 A1 | 9/2011 |
| EP | 0908022 A2 | 4/1999 |
| EP | 1912392 A2 | 4/2008 |
| EP | 2743726 A1 | 6/2014 |
| EP | 2466964 B1 | 12/2017 |
| EP | 3026961 B1 | 8/2020 |
| GB | 2542491 A | 3/2017 |

(56) References Cited

FOREIGN PATENT DOCUMENTS

| | | | |
|---|---|---|---|
| GB | 2568122 | B | 11/2019 |
| JP | 1290684 | B2 | 7/2009 |
| JP | 5164157 | B2 | 3/2013 |
| KR | 1020040107702 | A | 12/2004 |
| KR | 100568976 | B1 | 4/2006 |
| KR | 1020060078814 | A | 7/2006 |
| KR | 1020160071964 | A | 6/2016 |
| WO | 2008157609 | A3 | 3/2009 |
| WO | 2012062091 | A1 | 5/2012 |
| WO | 2012165938 | A1 | 12/2012 |
| WO | 2015114077 | A1 | 8/2015 |
| WO | 2015143604 | A1 | 10/2015 |
| WO | 2017101575 | A1 | 6/2017 |
| WO | 2018077864 | A1 | 5/2018 |
| WO | 2019045767 | A1 | 3/2019 |
| WO | 2020165627 | A1 | 8/2020 |
| WO | 2021251902 | A1 | 12/2021 |
| WO | 2022221429 | A1 | 10/2022 |

OTHER PUBLICATIONS

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/57,920, filed Jul. 5, 2022, Loren et al.
Extended Search Report for European Application No. 21188737.7 dated Dec. 10, 2021, 8 pages.
U.S. Appl. No. 17/233,107, filed Apr. 16, 2021, Eric J. Loren.
U.S. Appl. No. 16/987,671, filed Aug. 7, 2021, Kwon et al.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf.org/html/drafts-yi-manet-pc-00, Nov. 14, 2001, 31 pages.

* cited by examiner

400 ↘

402 — IDENTIFYING VIA A RECEIVING (RX) NODE OF TH MULTI-NODE COMMUNICATIONS NETWORK, A PLURALITY OF SIGNALS TRANSMITTED BY A TRANSMITTING (TX) NODE OF THE MULTI-NODE COMMUNICATIONS NETWORK THE PLURALITY OF SIGNALS CORRESPONDING TO A SET OF DOPPLER NULLING ANGLES TRAVERSED BY THE T X NODE AND TO AT LEAST ONE FREQUENCY ADJUSTMENT OF THE TX NODE TO RESOLVE A DOPPLER FREQUENCY OFFSET AT THE CORRESPONDING DOPPLER NULLING ANGLE, THE TX NODE MOVING RELATIVE TO THE RX NODE ACCORDING TO ONE OR MORE OF A VELOCITY VECTOR AND AN ANGULAR DIRECTION

404 — DETERMINING VIA THE RX NODE, BASED ON THE PLURALITY OF IDENTIFIED SIGNALS, A PLURALITY OF FREQUENCY SHIFT POINTS (FSP), EACH FSP CORRESPONDING TO A DOPPLER FREQUENCY SHIFT AT THE CORRESPONDING DOPPLER NULLING ANGLE AND TO, A RELATIVE RADIAL VELOCITY BETWEEN THE TX AND RX NODES

406 — DETERMINING, BASED ON THE PLURALITY OF FSPS, A MAGNITUDE OF THE VELOCITY VECTOR

408 — GENERATING AT LEAST ONE FREQUENCY SHIFT PROFILE ASSOCIATED WITH THE PLURALITY OF FSPS

410 — DETERMINING, BASED ON THE AT LEAST ONE FREQUENCY SHIFT PROFILE, ONE OR MORE PARAMETERS SELECTED FROM A GROUP INCLUDING 1) A DIRECTIONAL COMPONENT OF THE VELOCITY VECTOR AND 2) THE ANGULAR DIRECTION

FIG.4A

SYSTEM AND METHOD FOR APPLICATION OF DOPPLER CORRECTIONS FOR TIME SYNCHRONIZED TRANSMITTER AND RECEIVER

CROSS-REFERENCE TO RELATED APPLICATIONS

The present application is related to: U.S. application Ser. No. 17/233,017, filed Apr. 16, 2021. U.S. application Ser. No. 17/233,017 is herein incorporated by reference in its entirety.

BACKGROUND

Mobile Ad-hoc NETworks (MANET; e.g., "mesh networks") are known in the art as quickly deployable, self-configuring wireless networks with no pre-defined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

MANETs face many challenges due to the limited network awareness inherent in such highly dynamic, low-infrastructure communication systems. Given the broad ranges in variable spaces, the challenges lie in making good decisions based on such limited information. For example, in static networks with fixed topologies, protocols can propagate information throughout the network to determine the network structure, but in dynamic topologies this information quickly becomes stale and must be periodically refreshed. It has been suggested that directional systems are the future of MANETs, but this future has not as yet been realized. In addition to topology factors, fast-moving platforms (e.g., communications nodes moving relative to each other) experience a frequency Doppler shift (e.g., offset) due to the relative radial velocity between each set of nodes. This Doppler frequency shift often limits receive sensitivity levels which can be achieved by a node within a mobile network.

SUMMARY

A system may include a transmitter node and a receiver node. Each node may include a communications interface including at least one antenna element and a controller operatively coupled to the communications interface, the controller including one or more processors. Each node may be time synchronized to apply Doppler corrections to said node's own motions relative to a stationary common inertial reference frame. The stationary common inertial reference frame may be known to the transmitter node and the receiver node prior to the transmitter node transmitting signals to the receiver node and prior to the receiver node receiving the signals from the transmitter node.

In a further aspect, a method may include time synchronizing each node of a transmitter node and a receiver node, wherein each node of the transmitter node and the receiver node comprises a communications interface including at least one antenna element, wherein each node of the transmitter node and the receiver node further comprises a controller operatively coupled to the communications interface, the controller including one or more processors. The method may further include based at least on the time synchronizing, applying, by the transmitter node, Doppler corrections to the transmitter node's own motions relative to a stationary common inertial reference frame. The method may further include based at least on the time synchronizing, applying, by the receiver node, Doppler corrections to the receiver node's own motions relative to the stationary common inertial reference frame. The stationary common inertial reference frame is known to the transmitter node and the receiver node prior to the transmitter node transmitting signals to the receiver node and prior to the receiver node receiving the signals from the transmitter node.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 4A through 4C are flow diagrams illustrating a method for Doppler frequency offset determination according to example embodiments of this disclosure;

DETAILED DESCRIPTION

Figure 1:
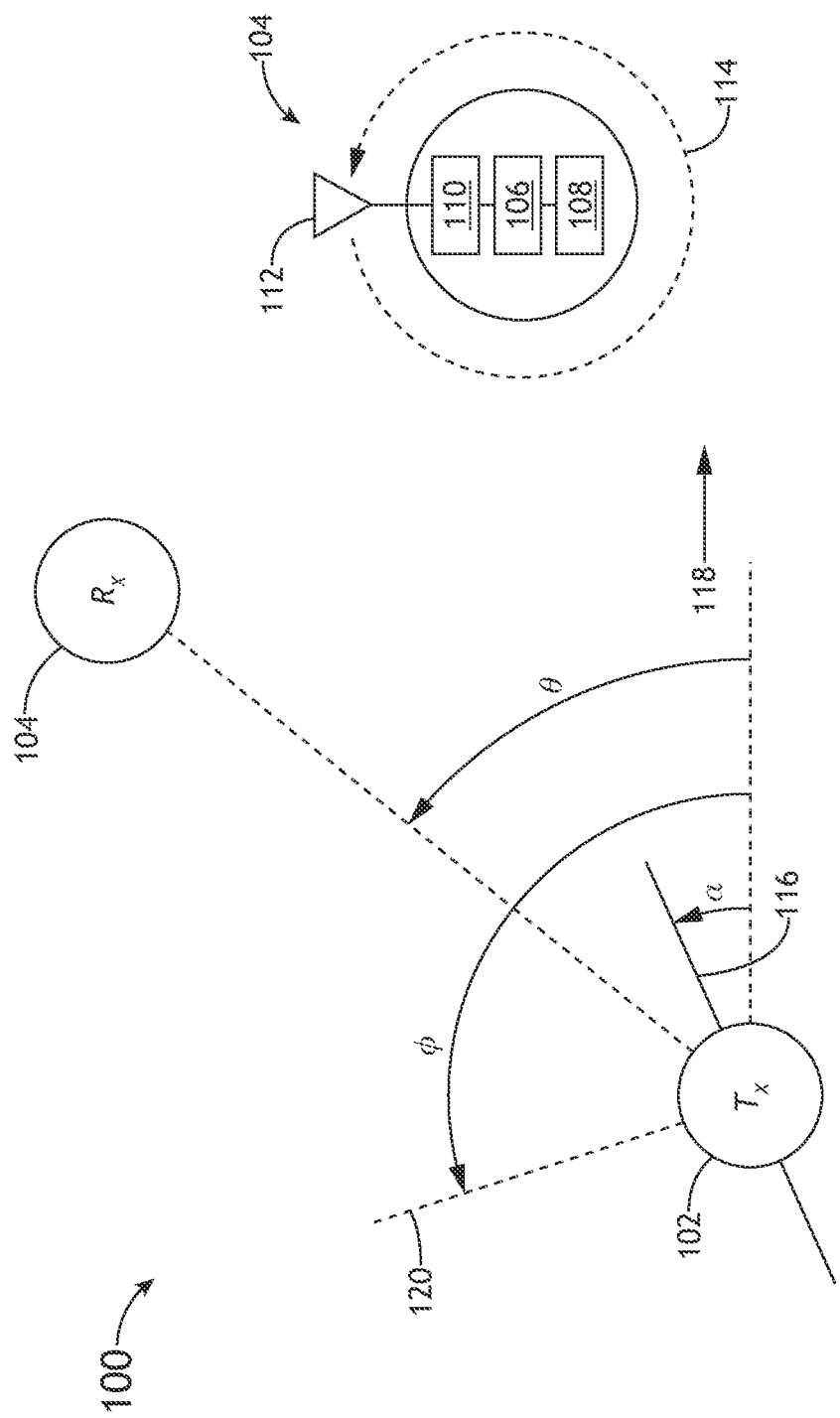
FIG. 1 is a diagrammatic illustration of a mobile ad hoc network (MANET) and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a method and a system including a transmitter node and a receiver node, which may be time synchronized to apply Doppler corrections to said node's own motions relative to a stationary common inertial reference frame.

Some embodiments may include a system and method for determining relative velocity vectors, directions, and clock frequency offsets between mutually dynamic communication nodes of a mobile ad hoc network (MANET) or similar multi-node communications network. For example, via the use of omnidirectional antennas for Doppler null scanning (or, in some embodiments, directional antennas that require directional tracking via spatial scanning), directional topologies of neighbor nodes in highly dynamic network environments may be determined. Further, if Doppler null scanning knowledge is common to all nodes, receiver nodes may tune to the appropriate Doppler frequency shift to maintain full coherent sensitivity.

Referring to FIG. 1, a multi-node communications network 100 is disclosed. The multi-node communications network 100 may include multiple communications nodes, e.g., a transmitter (Tx) node 102 and a receiver (Rx) node 104.

In embodiments, the multi-node communications network 100 may include any multi-node communications network known in the art. For example, the multi-node communications network 100 may include a mobile ad-hoc network (MANET) in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios, mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104.

In embodiments, the Tx node 102 and Rx node 104 may both be moving in an arbitrary direction at an arbitrary speed, and may similarly be moving relative to each other. For example, the Tx node 102 may be moving relative to the Rx node 104 according to a velocity vector 116, at a relative velocity VTX and a relative angular direction (an angle α relative to an arbitrary direction 118 (e.g., due east); θ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle ϕ relative to the arbitrary direction 118). The transmitting waveform (e.g., the communications interface 110 of the Tx node 102) may be informed by the platform (e.g., the controller 106) of its velocity vector and orientation (e.g., α, $V_T$) and may adjust its transmitting frequency to remove the Doppler frequency shift at each Doppler nulling direction 120 and angle ϕ.

In embodiments, even if the Doppler nulling protocol is not known to the Rx node 104, the Rx node may observe (e.g., monitor, measure) the net frequency offset as the Tx node 102 covers (e.g., steers to, orients to, directs antenna elements 112 to) a range of Doppler nulling directions 120 (e.g., relative to the arbitrary direction 118, each Doppler nulling direction 120 having a corresponding Doppler nulling angle ϕ). Accordingly, the Rx node 104 may determine the magnitude of the parameter A of the velocity vector $\vec{V'}_T$ of the Tx node 102, to the degree that the Tx node covers both extremes (e.g., achieves both a minimum and a maximum velocity relative to the Rx node) such that $$A = f/c |\vec{V'}_T|$$

where f is the transmitting frequency of the Tx node and c is the speed of light. For example, each frequency shift point (FSP) detected by the Rx node 104 at a given Doppler nulling direction 120 may correspond to a velocity vector of the Tx node 102 relative to the Rx node. As noted above, and as described in greater detail below, the magnitude parameter A may incorporate a maximum and minimum relative velocity. If, however, the range of Doppler nulling angles ϕ is insufficiently broad, the magnitude parameter A may only include relative maxima and minima for that limited range of Doppler nulling angles (e.g., as opposed to the full 360 degrees of possible Doppler nulling angles; see, for example, FIGS. 2A-3B below).

In some embodiments, the Doppler nulling protocol and set of Doppler nulling directions 120 (and corresponding angles ϕ) may be known to the Rx node 104 and common to all other nodes of the multi-node communications network 100. For example, the Tx node 102 may perform the Doppler nulling protocol by pointing a Doppler null in each Doppler nulling direction 120 and angle ϕ of the set or range of directions as described above. The Rx node 104 may monitor the Tx node 102 as the Doppler nulling protocol is performed and may therefore determine, and resolve, the net Doppler frequency shift for each Doppler nulling direction 120 and angle ϕ.

In embodiments, although both the Tx and Rx nodes 102, 104 may be moving relative to the arbitrary direction 118, monitoring of the Doppler nulling protocol by the Rx node 104 may be performed and presented in the inertial reference frame of the Rx node 104 (e.g., in terms of the movement of the Tx node 102 relative to the Rx node 104) to eliminate the need for additional vector variables corresponding to the Rx node. For example, the velocity vector of the Tx node 102 in a global reference frame may be shifted according to the velocity vector of the Rx node 104, e.g.:

$$\vec{V'}_T = \vec{V}_T - \vec{V}_R$$

where $\vec{V'}_T$ is the velocity vector of the Tx node in the inertial reference frame of the Rx node and $\vec{V}_T$, $\vec{V}_R$ are respectively the velocity vectors of the Tx node and the Rx node in the Earth reference frame. In embodiments, either or both of the Tx node 102 and Rx node 104 may accordingly compensate for their own velocity vectors relative to the Earth and convert any relevant velocity vectors and relative velocity distributions into a global reference frame, e.g., for distribution throughout the multi-node communications network 100. In addition, while the representation of the relative motion between the Tx and Rx nodes 102, 104 is here presented in two dimensions, the relative motion (and, e.g., any associated velocity vectors, angular directions, Doppler nulling directions, and other parameters) may be presented in three dimensions with the addition of vertical/z-axis components.

Figure 2A:
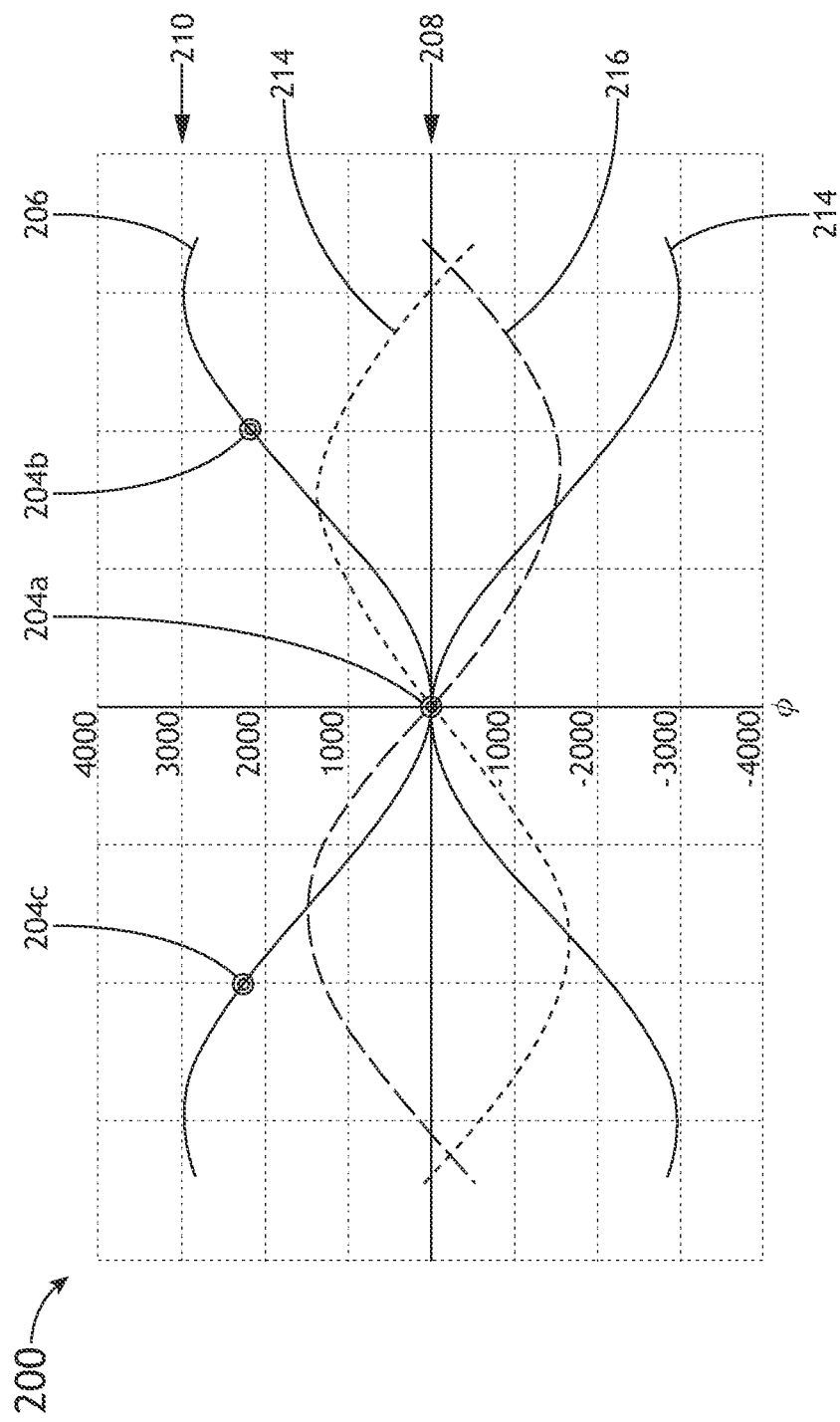
FIG. 2A is a graphical representation of frequency shift profiles within the MANET of FIG. 1.
Figure 2B:
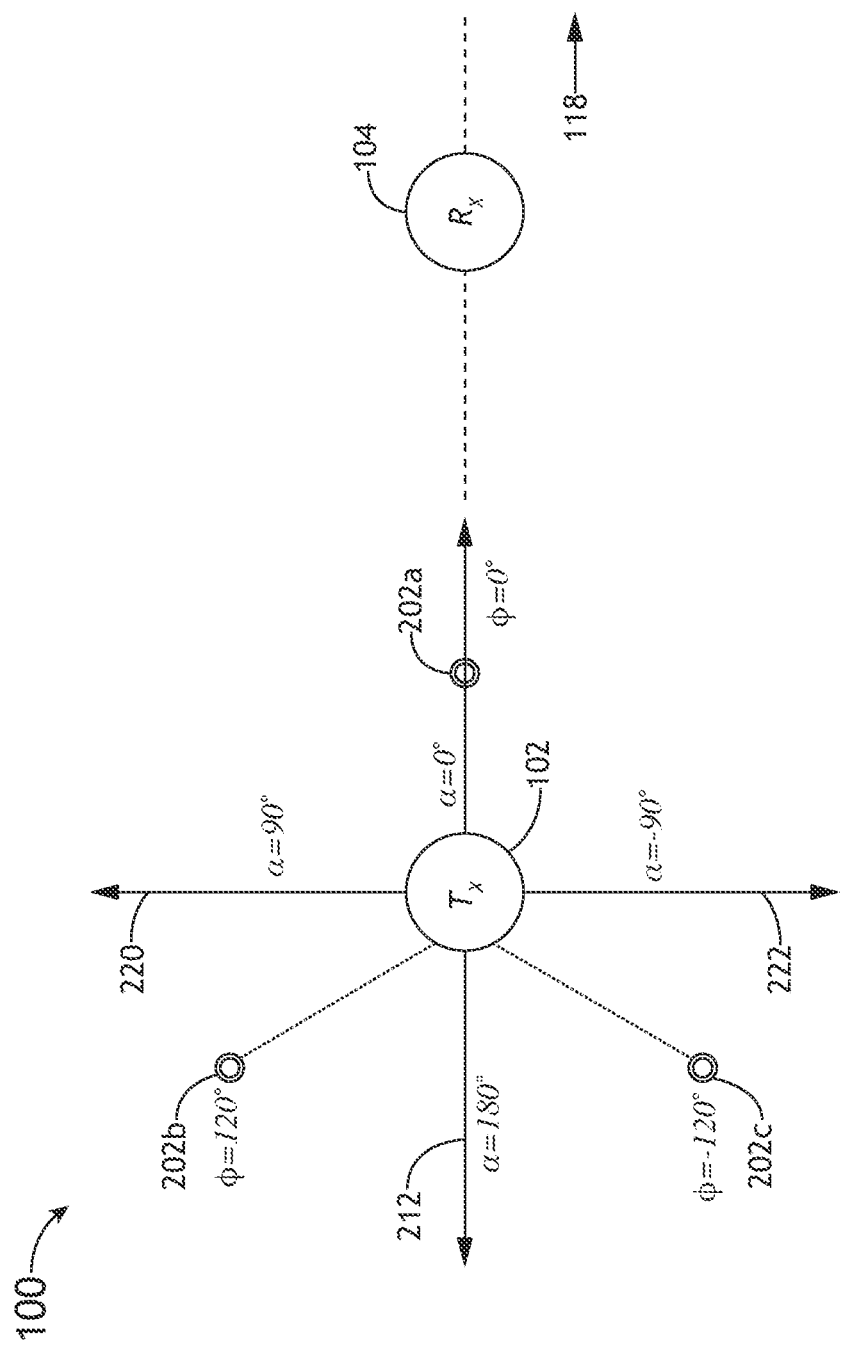
FIG. 2B is a diagrammatic illustration of varying directional components a of the velocity vector of a transmitter node Tx with respect to the graphical representation of FIG. 2A.

Referring now to FIGS. 2A and 2B, the graph 200 and multi-node communication network 100 are respectively shown. The graph 200 may plot frequency shift profiles for varying directional components (α, FIG. 2B) of the velocity vector of the Tx node (102, FIG. 2B) relative to the Rx node (104, FIG. 2B) for multiple Doppler nulling directions (120, FIG. 1) and angles ϕ (e.g., relative to the arbitrary direction (118, FIG. 2B)) and velocity VTX of the Tx node. In the interest of clarity, the graph 200 and other plots of frequency shift profiles provided below may be scaled by c/f to eliminate the ratio f/c (where, as noted above, f is the transmitting frequency of the Tx node 102 and c is the speed of light).

In embodiments, the Rx node 104 may repeat the net Doppler frequency shift determination and resolution process for multiple Doppler nulling directions 120 and angles ϕ of the Tx node 102 (e.g., chosen at random or according to predetermined or preprogrammed protocol). For example, the Tx node 102 may scan through at least three Doppler nulling directions (202a-c, FIG. 2B)/angles ϕ and map, via the corresponding frequency shift points, the distribution of the dependent Doppler frequency shift for each Doppler nulling direction and angle ϕ. The graph 200 may plot frequency shift profiles for varying directional components α relative to the arbitrary direction 118 assuming the angular direction θ=0 (e.g., consistent with an Rx node 104 moving due east) and velocity VTX of the Tx node 102=1500 m/s. As it is well known that the Doppler frequency shift is a sinusoidal distribution relative to the angle ϕ of the Doppler nulling directions 202a-c, measurements at multiple Doppler nulling directions of the Tx node 102 by the Rx node 104 may generate frequency shift points (204a-c, FIG. 2A) to which a frequency shift profile 206 may be mapped as a sinusoidal curve showing the distribution of relative velocity between the Tx and Rx nodes 102, 104 through the full range of Doppler nulling angles ϕ (e.g., assuming the maximum and minimum relative velocities are included).

In embodiments, the amplitude of the frequency shift profile 206 may correspond to the velocity of the Tx node 102 relative to the Rx node 104. For example, even if the Doppler nulling protocol is not known to the Rx node 104, a magnitude parameter A of the velocity vector $\vec{V'}_T$ of the Tx node 102 (e.g., in the reference frame of the Rx node) may still be determined, e.g., between a minimum relative velocity 208 (e.g., 0 m/s) and a maximum relative velocity 210 (e.g., 3000 m/s, or consistent with Tx and Rx nodes traveling in opposing directions (α=180°, consistent with a Tx node traveling due west (212) and the phase-offset frequency shift profile 214).

In embodiments, as α varies the frequency shift profiles 214, 216, 218 may present as phase-offset versions of the frequency shift profile 206 (e.g., with similarly offset maximum and minimum relative velocities). For example (in addition to the frequency shift profile 214 noted above), the frequency shift profile 216 may correspond to α=90°, consistent with a Tx node traveling due north (220) and the frequency shift profile 218 may correspond to α=−90°, consistent with a Tx node traveling due south (222).

In embodiments, the frequency shift profiles 206, 214, 216, 218 may allow the Rx node 104 to derive parameters in addition to the magnitude parameter A of the velocity vector $\vec{V'}_T$ of the Tx node 102. For example, the true Doppler frequency shift due to the relative radial velocity between the Tx and Rx nodes 102, 104 may be, as seen by the Rx node:

$$\Delta f'_{Doppler} = \frac{f}{c}|\vec{V_T}|\cos(\theta - \alpha)$$

and the Tx node 102 may, per the Doppler nulling protocol, adjust the transmitting frequency f due to its velocity projection at the Doppler nulling angle ϕ such that:

$$\Delta f_{Pr} = -\frac{f}{c}|\vec{V_T}|\cos(\varphi - \alpha)$$

and the net Doppler frequency shift, also accounting for clock frequency offset $\Delta f_{clock}$, may therefore be:

$$\Delta f_{net} = \frac{f}{c}|\vec{V_T}|[\cos(\theta - \alpha) - \cos(\varphi - \alpha)] + \Delta f_{clock}$$

assuming, for example, that the velocity vector and direction change slowly relative to periodic measurements of $\Delta f_{net}$. It should be noted that $\Delta f_{net}$ as presented above represents a net frequency offset from nominal incorporating f/c (compare, e.g., FIGS. 2A-B and accompanying text above). Under these conditions, from the perspective of the Rx node 104 the parameters α, $T_x$, and θ may be taken as constants, and the net frequency offset $\Delta f_{net}$ may also be expressed as:

$$\Delta f_{net} = A\cos(\varphi + B) + C$$

where the constant parameters A, B, and C may be determined via at least three measurements of a Doppler nulling angle ϕ. As noted above, $$A = f/c|\vec{V'}_T|$$

while also $$B = \pi - \alpha$$

and $$C = \frac{f}{c}|\vec{V_T}|\cos(\theta - \alpha) + \Delta f_{clock}$$

where, as noted above, A may correspond to the magnitude of the velocity vector of the Tx node 102 relative to the Rx node 104. Similarly, B may correspond to the directional component α of the velocity vector and C to the angular direction θ of the Rx node 104.

In embodiments, once the parameters A, B, and C are determined, the parameters α, V'$_T$, θ, may be derived therefrom as can be seen above. For example, when the clock frequency offset $\Delta f_{clock}$ is zero it is straightforward to derive θ from C above. However, when the clock frequency offset $\Delta f_{clock}$ is nonzero, the Rx node 104 may determine $\Delta f_{clock}$ by exchanging information with the Tx node 102. For example, the Rx and Tx nodes 104, 102 may switch roles: the Rx node 104 may perform the Doppler nulling protocol for various Doppler nulling directions 120 and angles ϕ while the Tx node 102 monitors the Doppler nulling protocol to resolve the net Doppler frequency shift for θ'=θ+π (and $\Delta f'_{clock} = -\Delta f_{clock}$). The Tx node 102 may share this information with the Rx node 104, which may merge information from both directions to determine θ and $\Delta f_{clock}$.

Figure 3A:
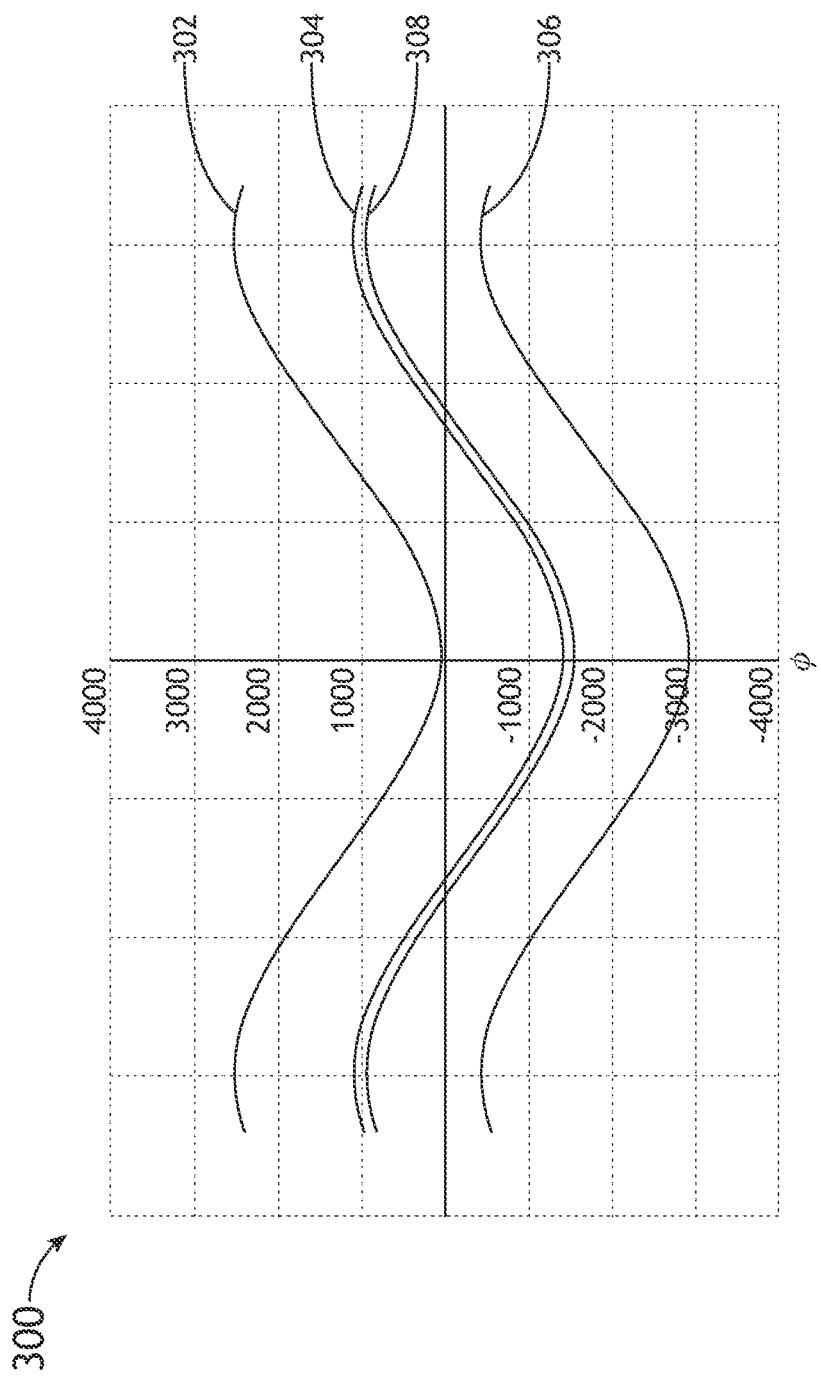
FIG. 3A is a graphical representation of frequency shift profiles within the MANET of FIG. 1.
Figure 3B:
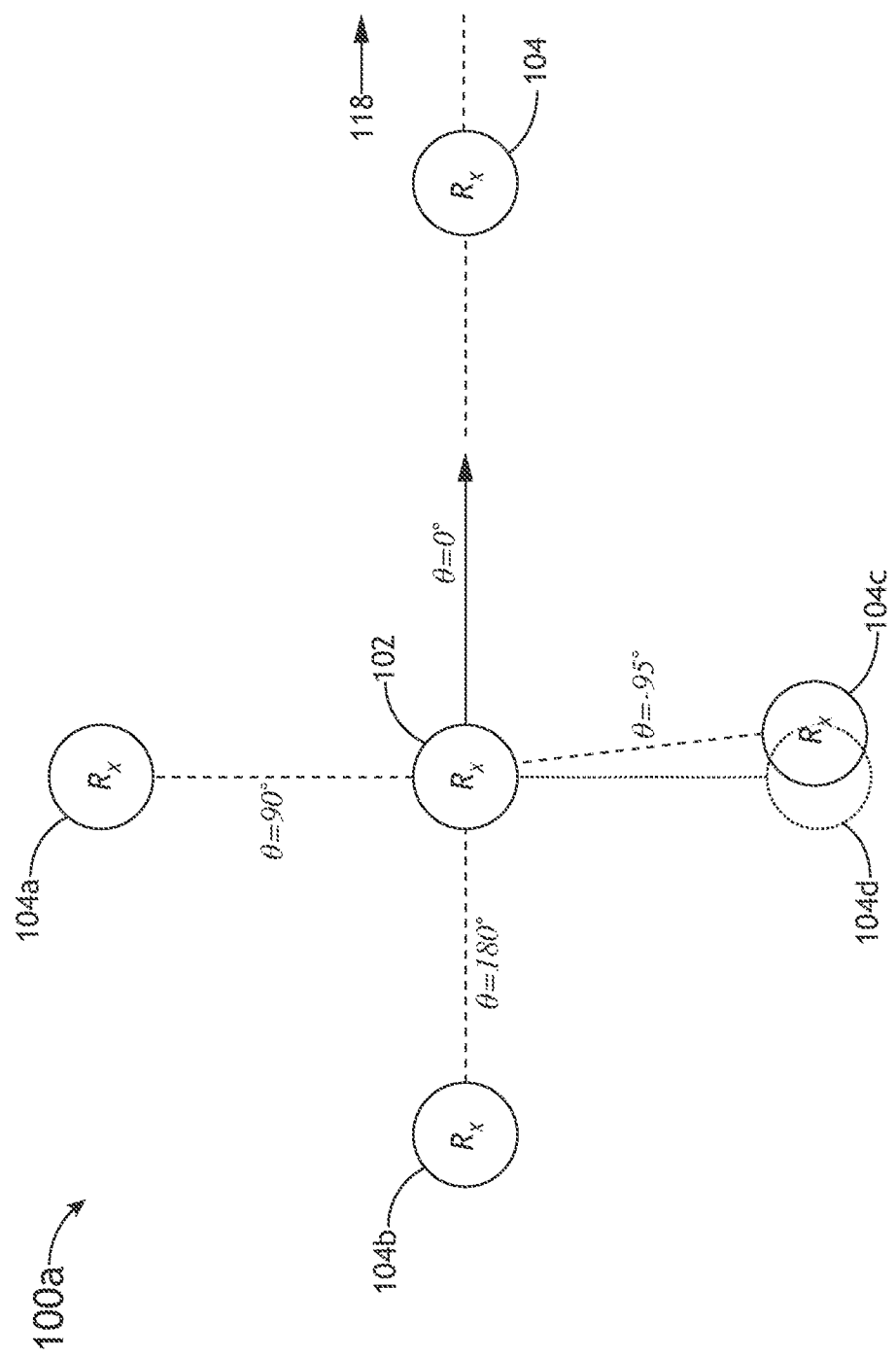
FIG. 3B is a diagrammatic illustration of varying angular directions θ of a receiver node Rx with respect to the graphical representation of FIG. 3A.

Referring now to FIGS. 3A and 3B, the graph 300 and multi-node communication network 100a may be implemented and may function similarly to the graph 200 and multi-node communication network 100 of FIGS. 2A and 2B, except that the graph 300 and multi-node communication network 100a may reflect a consistent zero directional component α (e.g., a Tx node (102, FIG. 3B) moving in or parallel to the arbitrary direction (118, FIG. 3B, e.g., due east)) and variable angular directions θ of the Rx node (104, 104a-c, FIG. 3B) relative to the Tx node.

In embodiments, the frequency profiles (302, 304, 306, 308; FIG. 3A) may respectively be associated with θ=0° (e.g., consistent with the Rx node 104 lying directly in the path of the Tx node 102); θ=90° (Rx node 104a); θ=180° (Rx node 104b, consistent with the Tx node moving in the opposing direction from the Rx node (e.g., an Rx node moving due west)); and θ=−95° (Rx node 104c). Referring in particular to FIG. 3A, the frequency profiles 302-308 may be shifted in amplitude (rather than in phase, as shown by the graph 200 of FIG. 2A) such that the Doppler frequency shift varies only in magnitude (e.g., relative maximum and minimum velocities). It may be noted that the frequency shift profile 304 (θ=90°) appears identical to the frequency shift profile associated with θ=−90° (Rx node 104d), where both angular directions θ are perpendicular to the velocity vector of the Tx node 102 (directional component α) but mutually opposed. If, for example, an Rx node 104a, 104d communication node enters the multi-node communication network 100a at such a position and velocity, a one-time determination may have to be made by other means (e.g., or by waiting for a change in Rx node velocity or in θ) to precisely determine θ (e.g., +90°/−90°), after which determination the precise θ can be tracked without ambiguity.

In some embodiments, the Rx node 104, 104a-c may assess and determine Doppler effects due to the relative motion of the Tx node 102 by measuring time differential points (TDP) rather than FSPs. For example, a signal transmitted at 1 kHz by the Tx node 102 may be subject to 10 Hz of Doppler frequency shift. This one-percent (1%) change in frequency may be alternatively expressed as a differential of one percent in the time required to measure a cycle of the transmitted signal (or, e.g., any arbitrary number of cycles). The Doppler effect may be precisely and equivalently characterized in either the frequency domain or the time domain. For example, the graphs 200, 300 of FIGS. 2A and 3A, which plot the velocity vector of the Tx node 102 relative to the Rx node 104, 104a-c (y-axis) against the Doppler nulling angle ϕ, may remain consistent between the frequency domain and the time domain, with the exception that each FSP (204a-c, FIG. 2A) corresponds to a measured time differential at a given Doppler nulling angle ϕ (e.g., to a TDP) rather than to a measured frequency shift at that nulling angle.

In some embodiments, due to the nature of the transmitted signal (or, e.g., other conditions) it may be easier or more advantageous for the Rx node 104 to determine the Doppler shift in the time domain rather than in the frequency domain. For example, when the signal transmitted by the Tx node 102 at a given Doppler nulling direction (202a-c, FIG. 2B) consists of a series of short pulses and a long pulse repetition interval (e.g., as opposed to, e.g., a continuous short-duration pulse), the Rx node 104 may instead determine the Doppler shift to be resolved by measuring the time differential between received cycles of the transmitted signal and generating time differential profiles based on each determined set of TDPs. As the resulting time differential profiles plot the relative velocity vector of the Tx node 102 over a set of Doppler nulling angles ϕ similarly to the frequency shift profile graphs 200, 300, of FIGS. 2A and 3A, the same information can be determined by the Rx node 104.

Figure 4B:
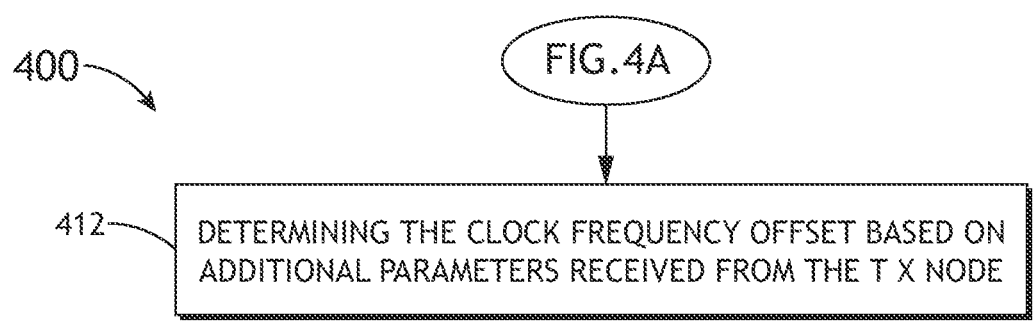
Figure 4C:
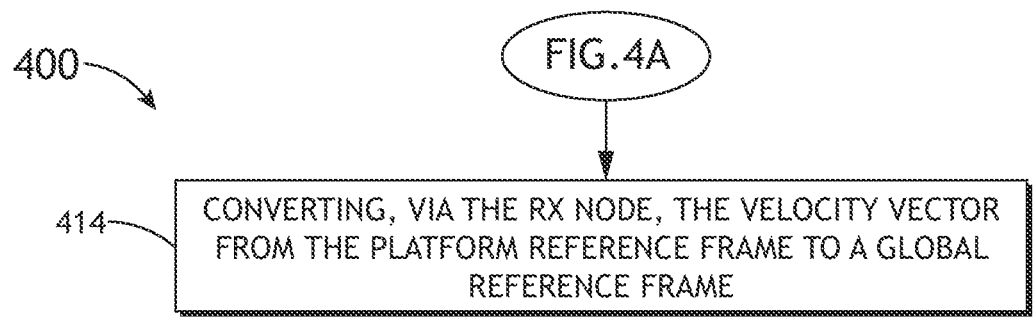

FIGS. 4A-C—Method

Referring now to FIG. 4A, the method 400 may be implemented by the multi-node communications networks 100, 100a and may include the following steps.

At a step 402, a receiver (Rx) node of the multi-node communications network monitors a transmitter (Tx) node of the network to identify signals transmitted by the Tx node through a range of Doppler nulling angles (e.g., or a set of discrete Doppler nulling angles), the signals including adjustments to the transmitting frequency to counter Doppler frequency offset at each Doppler nulling angle. For example, the Tx node may be moving relative to the Rx node according to a velocity vector and an angular direction. Each identified signal may correspond to a particular Tx frequency adjustment (e.g., a net frequency shift detected by the Rx node) at a particular Doppler nulling angle to resolve a Doppler frequency offset at that angle.

At a step 404, a controller of the Rx node determines, based on the monitoring and identified signals, a set (e.g., three or more) of frequency shift points (FSP), where each FSP corresponds to a net frequency shift of the signal. For example, each FSP may correspond to the Tx node (e.g., aware of its velocity vector and platform orientation) scanning in a Doppler nulling direction and adjusting its transmit frequency to resolve the Doppler offset at the corresponding Doppler nulling angle ϕ according to a nulling protocol, resulting in the net frequency shift detected by the Rx node. In some embodiments, the Rx node measures the net frequency shift in the time domain rather than in the frequency domain. For example, the Rx node may measure a time differential associated with a received cycle or cycles of the identified signal, the time differential corresponding to the net frequency shift at the corresponding Doppler nulling angle.

At a step 406, the controller determines, based on the plurality of frequency shift points, a magnitude of the relative velocity vector between the Tx and Rx nodes (e.g., in the reference frame of the Rx node). For example, from the magnitude of the velocity can be derived a maximum and minimum relative velocity with respect to the range of Doppler nulling angles ϕ.

In some embodiments, the range or set of Doppler nulling angles ϕ may be known to all nodes of the multi-node communications network (e.g., including the Rx node) and the method 400 may include the additional steps 408 and 410.

At the step 408, the Rx node maps the determined FSPs to a frequency shift profile corresponding to a distribution (e.g., a sinusoidal curve) of the ϕ-dependent net frequency shift over all possible Doppler nulling angles ϕ. In some embodiments, the controller further determines a phase offset of the frequency shift profile.

At the step 410, the controller determines, based on the frequency shift profile, a velocity $V'_T$ and a directional component α of the velocity vector (e.g., of the Tx node 102 relative to an arbitrary direction) and the angular direction θ (e.g., of the Rx node relative to the arbitrary direction).

Referring also to FIG. 4B, the method 400 may include an additional step 412. At the step 412, the angular direction θ incorporates a clock frequency offset between the Tx and Rx nodes, which the Rx node determines based on additional information received from the Tx node.

Referring now to FIG. 4C, the method 400 may include an additional step 414. At the step 414, the velocity vector may be in an inertial reference frame specific to the Rx node. For example, the Rx node may convert the velocity vector from its own platform reference frame to a global reference frame.

FIGS. 5-8—Application of Doppler Corrections

Referring now to FIG. 5-8, illustrations pertaining to exemplary embodiments of applications of the foregoing in a system (e.g., the multi-node communications network 100) according to the inventive concepts disclosed herein are depicted.

Figure 5:
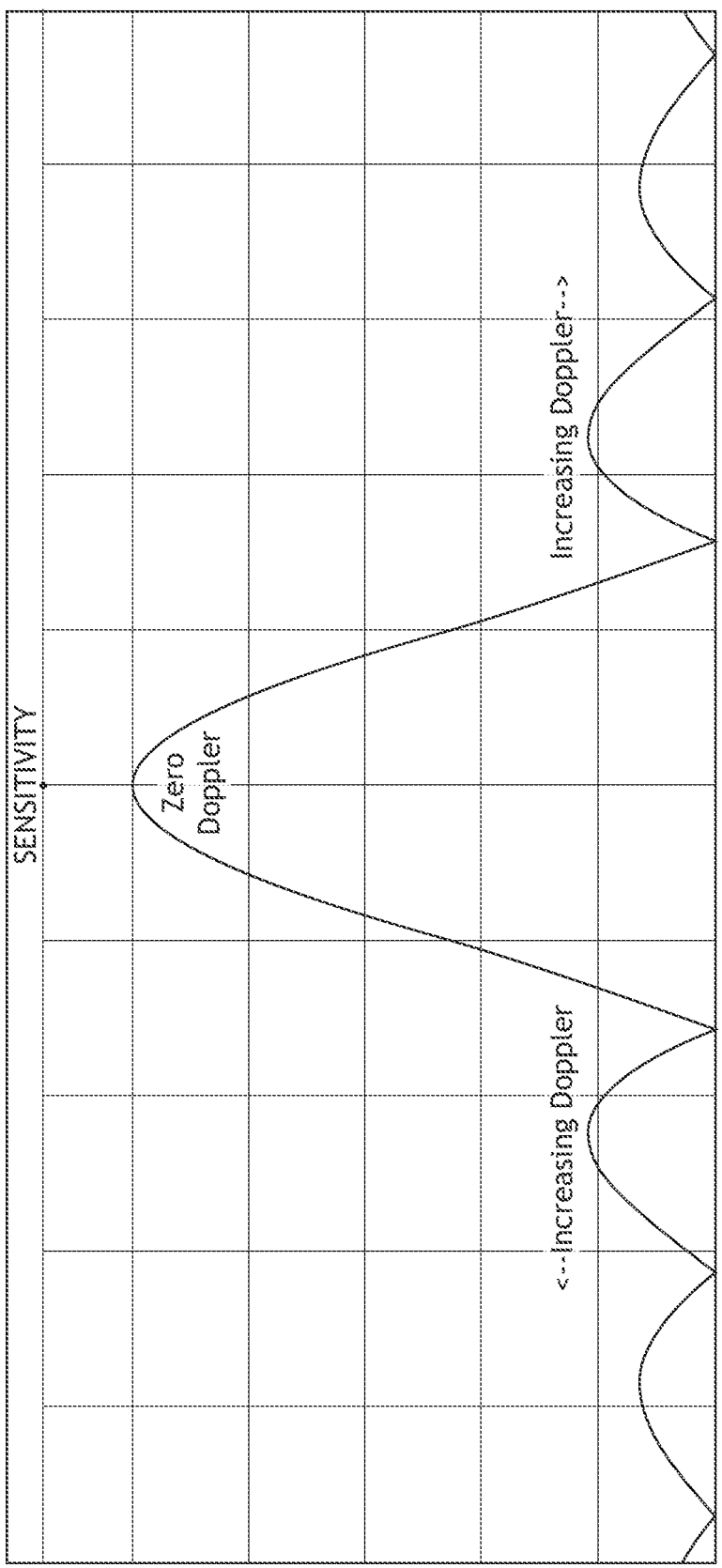
FIG. 5 is an exemplary graph of sensitivity versus Doppler effect magnitude.

Referring now to FIG. 5, detection sensitivity for weak radio signals is often limited by the Doppler effect which incidentally adds frequency shifts to the signal due to motion. Doppler shift can result either from transmitter motion and/or receiver motion, often both. Sensitivity caused by Doppler modulation can be characterized mathematically from the sine cardinal (sinc) squared function (i.e., $\sin^2(x)/x$). Receive sensitivity is progressively reduced as Doppler magnitude increases, as shown in FIG. 5. Typically, Doppler effects become most noticeable when relative motion is large and channel frequencies are high.

For current modern radio systems, the problem becomes progressively acute with increasing channel frequencies and directional antennas. With increasing channel frequencies comes correspondingly increased Doppler. Because directional systems must allot time for discovery in multiple directions, any increase in acquisition time caused by Doppler shift increases overall discovery time, with accompanying system performance degradations.

Signal acquisition and detection sensitivity in current modern digital communications systems are most often contingent on a digital correlation sequence. Usable length for such a correlation sequence (and consequent resulting sensitivity) may be limited by Doppler shift as phase rotation increases across the correlator length resulting in the aforementioned sinc function correlation amplitude variation relative to Doppler frequency offset. With increasing signal frequency offsets, optimal correlator length decreases, and a system designer should choose a correlator length suitable to the Doppler requirements. Multiple short length correlation sequences are subsequently often used to allow sensitivity improvement beyond that of a single short correlation sequence but such an approach exhibits degraded sensitivity compared to a single long sequence of the same total length. In the presence of large Doppler shift, even a combination of multiple short sequences may be problematic. While multiple short sequences may be better than nothing, for the same number of bits the approach does not deliver the same sensitivity attainable with coherent detection of a single long sequence without Doppler.

In summary, currently, a short correlation sequence is relatively unaffected by Doppler but has the drawback of yielding low sensitivity, whereas a long correlation sequence may be capable of yielding high sensitivity but only when Doppler is minimal.

Figure 6:
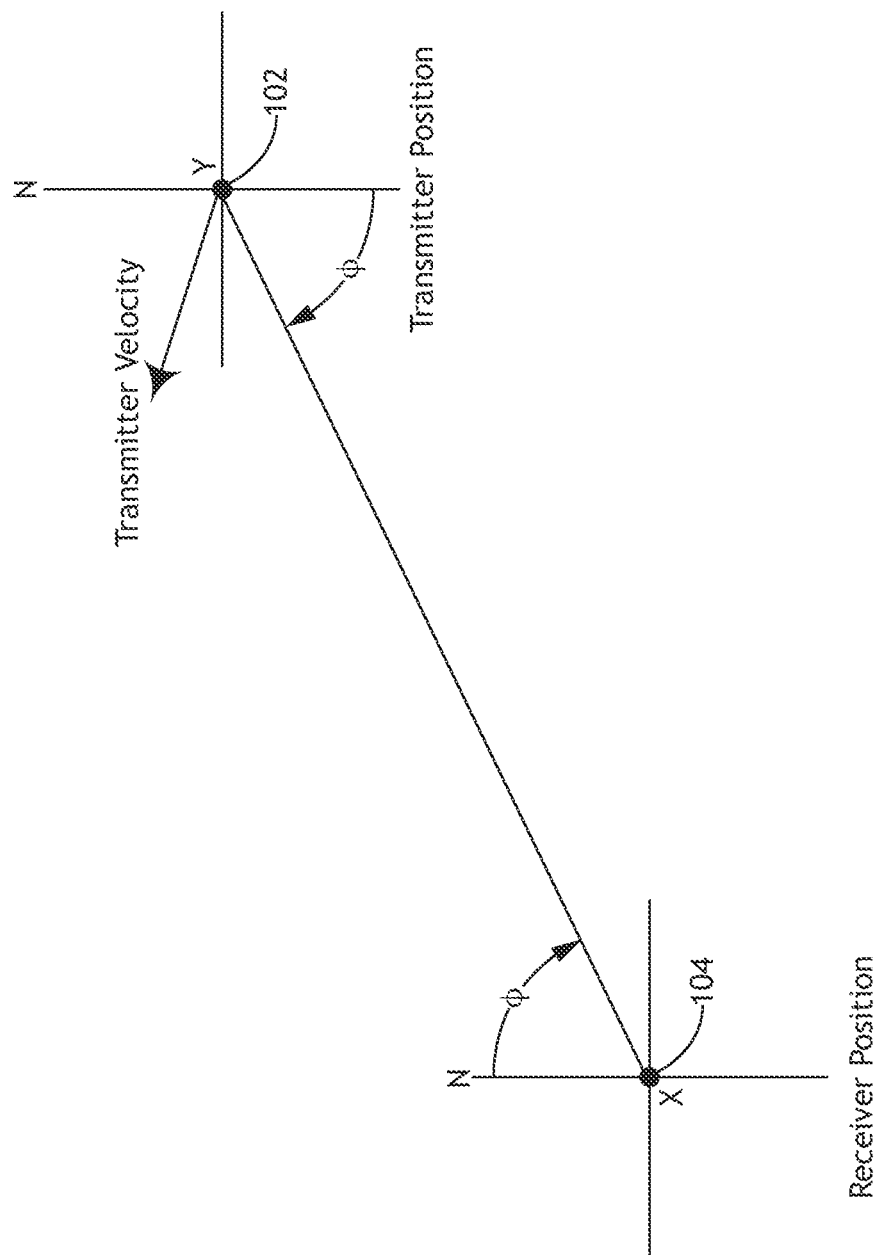
FIG. 6 is a diagrammatic illustration of a transmitter node and a receiver node according to example embodiments of this disclosure.

Referring now to FIG. 6, an exemplary embodiment of a system (e.g., the multi-node communications network 100) according to the inventive concepts disclosed herein is depicted. The system (e.g., the multi-node communications network 100) may include a transmitter node 102 and a receiver node 104.

The transmitter node 102 and the receiver node 104 can be time synchronized to apply Doppler correction respectively for their own motions relative to a common inertial reference frame. As a transmit angle advances, a receive angle retreats by a same amount as the transmit angle advance. This can be understood by first considering a transmitter node 102 when the transmitter node 102 applies full Doppler correction in the transmitter node's 102 direction of travel. Next, consider a receiver node 104 directly in line with the path of travel for the transmitter node 102. If the receiver node 104 at the same time similarly applies Doppler correction for the receiver node's 104 motion in line with the transmitter node 102, then at least a near-zero Doppler path (e.g., a near-zero Doppler path or a zero Doppler path) will exist from the transmitter node 102 to the receiver node 104. As shown in FIG. 6, this concept is shown with an arbitrary angle $\phi$ when both the receiver node 104 and the transmitter node 102 utilize the same reference frame.

When both the receiver node 104 and the transmitter node 102 apply such synchronized Doppler correction relative to the common inertial reference frame, then the Doppler correction can be swept through a plurality of (e.g., some or all) angles so that a zero Doppler path or near-zero Doppler path will exist from the transmitter node 102 to the receiver node 104 including the angle resulting in the near-zero Doppler path or the zero Doppler path. A zero Doppler path has zero net frequency offset. For example, an angle resulting in the near-zero Doppler path may be an angle that is within 5 degrees of the angle resulting in the zero Doppler path. For any combination of the transmitter 102 and the receiver node 104 motions and locations, there exists a zero-Doppler path when the Doppler correction angle is equal to the direction angle $\phi$. Hence, a zero-Doppler path will be available between the transmitter node 102 and the receiver node 104 when the two are synchronized to apply Doppler correction for a swept angle $\phi$, relative to the inertial reference, as illustrated in FIG. 6. Neither the transmitter node 102 nor the receiver node 104 need to know a direction to the other node in advance.

Although FIG. 6 is shown for a two-dimensional reference frame, as this suffices for many line-of-sight scenarios (e.g., long-distance air-to-air communications), extension to three-dimensions is straight-forward (e.g., to support satellite communications). As an example, in a three-dimensional reference frame when the transmitter points up and North, the receiver points down and South. Three-dimensional scan time may be somewhat longer than two-dimensional scan time but remains well bounded for many scenarios.

With zero Doppler, a long correlation sequence, or even multiple long correlation sequences, can be employed to achieve significantly improved sensitivity relative to a short correlation sequence where the reduction in sensitivity can be predicted using the sinc function.

Figure 7:
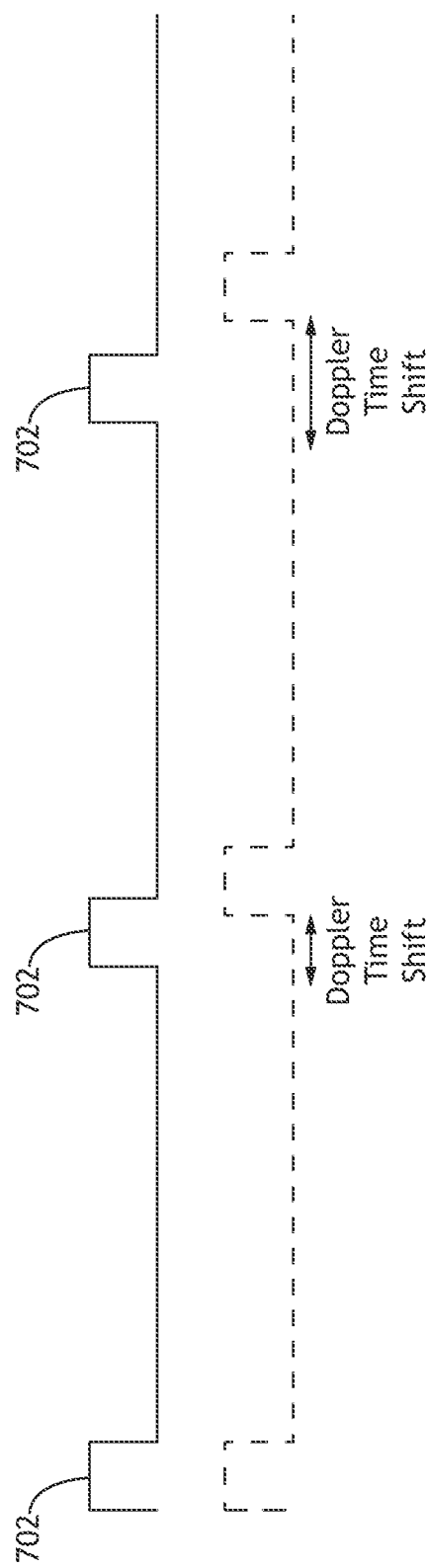
FIG. 7 is an illustration of sequential pulses showing the slipping of chip timing between pulses according to example embodiments of this disclosure.

Referring now to FIG. 7, in current practice, the Doppler effect is often compensated in just one of the frequency domain or the time domain, without taking both into account. For example, when transmitted pulses are short, then frequency correction within a pulse may suffice. The other component of Doppler correction involves the slipping of chip (or bit) timing between pulses, as illustrated in FIG. 7. After a pulse is transmitted, subsequent correction of Doppler time-error for subsequent pulses may be beneficial. With pulse-to-pulse timing corrected, it becomes possible to additively combine pulse-to-pulse correlation scores easily, thus improving sensitivity further, beyond the sensitivity attainable with single-pulse Doppler frequency error correction. Because exact time spacing between multiple pulses can be known a priori, based on a Doppler time correction, the non-coherent combining of individual pulse scores is achievable.

Because the amount of correlation needed to achieve desired sensitivity over a long pulse may require more processing horsepower than can be reasonably implemented, the benefit of repeated correlation using the same physical correlator for each individual pulse becomes more apparent. For example, with sufficient spacing between pulses a single correlator could be re-used for each subsequent pulse and the scores combined additively. With Doppler timing correction, the expected arrival time for each pulse can be known precisely and additive correlation can be used to significantly improve sensitivity. Whether coherent or non-coherent, such sparse pulse correlation involves little additional hardware or processing resources beyond the resources needed for single-pulse correlation, yet such sparse pulse correlation can yield significant additional sensitivity improvement.

In some embodiments, the system (e.g., the multi-node communications network 100) may include a transmitter node 102 and a receiver node 104. Each node of the transmitter node 102 and the receiver node 104 may include a communications interface 110 including at least one antenna element 112 and a controller operatively coupled to the communications interface, the controller 106 including one or more processors. The transmitter node 102 and the receiver node 104 may be time synchronized to apply Doppler corrections to said node's own motions relative to a stationary common inertial reference frame. The stationary common inertial reference frame may be known to the transmitter node 102 and the receiver node 104 prior to the transmitter node 102 transmitting signals to the receiver node 104 and prior to the receiver node 104 receiving the signals from the transmitter node 102. In some embodiments, the system is a mobile ad-hoc network (MANET) comprising the transmitter node 102 and the receiver node 104.

In some embodiments, the transmitter node 102 may be configured to apply the Doppler corrections relative to the stationary common inertial reference frame for a plurality of (e.g., some or all) azimuthal angles across a multi-pulse Doppler group such that each direction along one of the plurality of the azimuthal angles has a zero or near-zero Doppler time interval that would be known to the receiver node based on the time synchronization. The receiver node 104 may be configured to apply the Doppler corrections relative to the stationary common inertial reference frame for the plurality of the azimuthal angles across the multi-pulse Doppler group. The receiver node 104 may be configured to apply the Doppler corrections in an inverse fashion as compared to the transmitter node's 102 application of the Doppler corrections. The receiver node 104 may be further configured to receive a zero or near-zero Doppler pulse along a zero or near-zero Doppler path from the transmitter node 102 to the receiver node 104 with known time intervals. For example, a near-zero Doppler pulse may be a pulse of the multi-pulse Doppler group that is closest to an hypothetical zero Doppler pulse.

In some embodiments, the Doppler corrections are in both of the frequency domain and the time domain. In some embodiments, the zero or near-zero Doppler path is unknown to the transmitter node 102 and the receiver node 104 prior to transmission of the multi-pulse Doppler group. In some embodiments, the receiver node 104 is further configured to coherently detect across relatively long correlation sequences (e.g., as compared to relatively shorter correlation sequences). In some embodiments, with time corrected pulse-to-pulse, pulse-to-pulse Doppler dispersion is non-existent. In some embodiments, based at least on the non-existent pulse-to-pulse Doppler dispersion, the receiver node 104 has an increased sensitivity of signals from the transmitter node 102 as compared to a sensitivity of signals when the receiver node 104 experiences pulse-to-pulse Doppler dispersion. In some embodiments, based at least on the non-existent pulse-to-pulse Doppler dispersion, the receiver node 104 is further configured for deep-noise detection. Deep-noise discovery, as used herein, refers to finding signals so buried under noise that signal power is less than, for example, 1 percent of noise power (an equivalent signal-to-noise ratio (SNR) can be stated as −20 decibels (dB)). Employing this technique appears useful for very low SNR conditions where signal power levels of 0.1%, 0.01% or less (relative to noise) may be common. In some embodiments, the receiver node 104 is further configured to correct Doppler time-error for subsequent pulses. In some embodiments, the receiver node 104 is further configured to additively combine pulse-to-pulse correlation scores to further improve sensitivity of the signals from the transmitter node 102.

In some embodiments, the stationary common inertial reference frame is a two-dimensional (2D) stationary common inertial reference frame or a three-dimensional (3D) stationary common inertial reference frame.

In some embodiments, the at least one antenna element 112 of the transmitter node 102 comprises at least one of at least one directional antenna element or at least one omnidirectional antenna element. In some embodiments, the at least one antenna element 112 of the receiver node 104 comprises at least one of at least one directional antenna element or at least one omnidirectional antenna element.

Some embodiments solve a well-known, long-standing problem in communications systems. For example, some embodiments may employ Doppler-nulling, long correlation sequences, geometry and timing to facilitate rapid deep-noise acquisition of signals. Historically, high-Doppler signals have been difficult to acquire, even for modest sensitivity levels and acquisition times.

Traditionally, achieving deep-noise performance requires long correlation sequence length. Unfortunately, both Doppler magnitude and available processing resources tend to limit practical correlation length which can be implemented. Some embodiments outlined herein circumvent such limitations to a large extent. For example, a sparse-pulse acquisition approach presented above first applies Doppler frequency-shift correction for a single pulse to achieve high pulse acquisition sensitivity and then applies pulse-to-pulse Doppler time-shift correction to extend sensitivity looking across multiple pulses.

In some embodiments, with both Doppler frequency shift and time shift corrected within specific intervals known to both transmitter and receiver a priori, the receiver can employ coherent detection across multiple long correlation sequences. When Doppler time shift is corrected on a pulse-to-pulse basis, no pulse-to-pulse time dispersion exists, thus allowing for simple yet powerful deep-noise detection using relatively simple hardware and processing.

Some embodiments benefit both omni and directional systems. In some cases, sensitivity improvements may be improved by more than an order of magnitude. In addition, directional systems may experience corresponding improvement in another important dimension—discovery time can be correspondingly reduced along with sensitivity increases.

Some embodiments may be configured for rapid deep-noise acquisition and discovery, which may be a differentiating capability (over existing systems) for emerging low-observable, wideband or directional waveforms.

Unreliable discovery and acquisition of directional, wideband and low observable waveforms has at times resulted in significant failures. Some embodiments include a high-reliability solution. Increased performance in signal discovery and acquisition may enable reduced observability, increased bandwidth, and/or faster directional network discovery.

Figure 8:
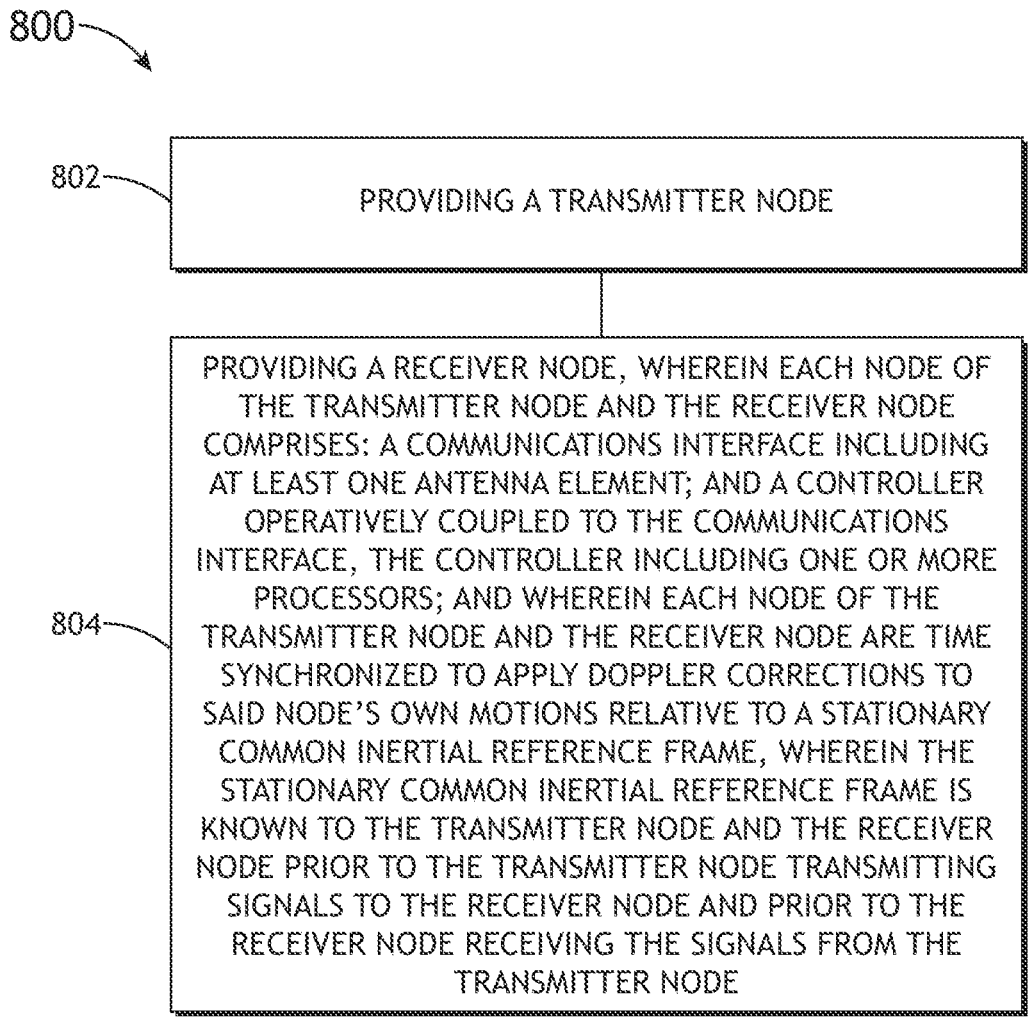
FIG. 8 is a flow diagram illustrating a method according to example embodiments of this disclosure.

Referring now to FIG. 8, an exemplary embodiment of a method 800 according to the inventive concepts disclosed herein may include one or more of the following steps. Additionally, for example, some embodiments may include performing one or more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include providing a transmitter node.

A step 804 may include providing a receiver node, wherein each node of the transmitter node and the receiver node comprises: a communications interface including at least one antenna element; and a controller operatively coupled to the communications interface, the controller including one or more processors; and wherein each node of the transmitter node and the receiver node are time synchronized to apply Doppler corrections to said node's own motions relative to a stationary common inertial reference frame, wherein the stationary common inertial reference frame is known to the transmitter node and the receiver node prior to the transmitter node transmitting signals to the receiver node and prior to the receiver node receiving the signals from the transmitter node.

Further, the method 800 may include any of the operations disclosed throughout.

Figure 9:
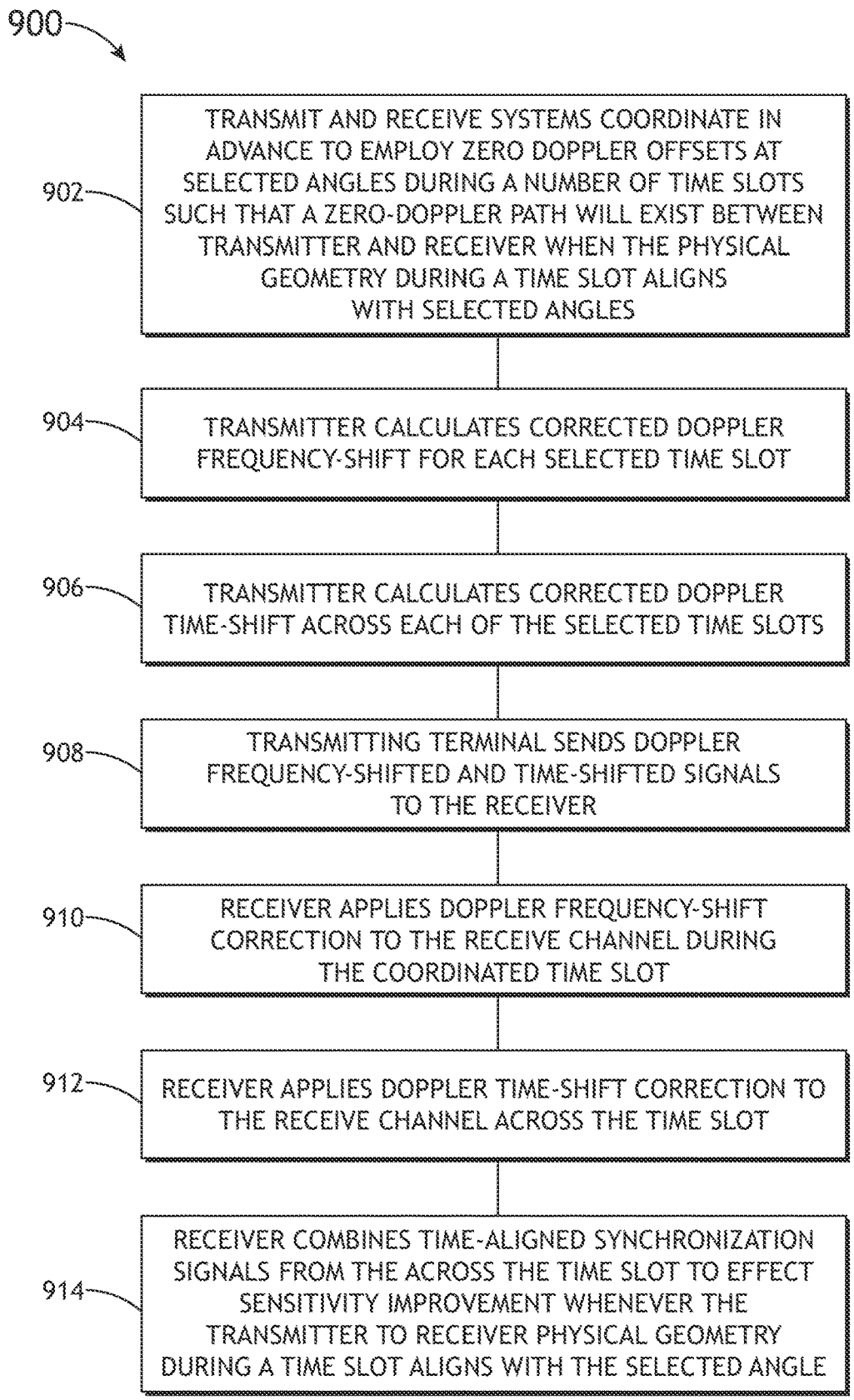
FIG. 9 is a flow diagram illustrating a method according to example embodiments of this disclosure.

Referring now to FIG. 9, an exemplary embodiment of a method 900 (e.g., a deep noise method) according to the inventive concepts disclosed herein may include one or more of the following steps. Additionally, for example, some embodiments may include performing one or more instances of the method 900 iteratively, concurrently, and/or sequentially. Additionally, for example, at least some of the steps of the method 900 may be performed in parallel and/or concurrently. Additionally, in some embodiments, at least some of the steps of the method 900 may be performed non-sequentially.

A step 902 may include transmit and receive systems coordinate in advance to employ zero Doppler offsets at selected angles during a number of time slots such that a zero-Doppler path will exist between transmitter and receiver when the physical geometry during a time slot aligns with selected angles.

A step 904 may include transmitter calculates corrected Doppler frequency-shift for each selected time slot.

A step 906 may include transmitter calculates corrected Doppler time-shift across each of the selected time slots.

A step 908 may include transmitting terminal sends Doppler frequency-shifted and time-shifted signals to the receiver.

A step 910 may include receiver applies Doppler frequency-shift correction to the receive channel during the coordinated time slot.

A step 912 may include receiver applies Doppler time-shift correction to the receive channel across the time slot.

A step 914 may include receiver combines time-aligned synchronization signals from the across the time slot to effect sensitivity improvement whenever the transmitter to receiver physical geometry during a time slot aligns with the selected angle.

Further, the method 900 may include any of the operations disclosed throughout.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system, comprising:
a transmitter node and a receiver node, wherein each node of the transmitter node and the receiver node comprises:
a communications interface including at least one antenna element; and
a controller operatively coupled to the communications interface, the controller including one or more processors;
wherein each node of the transmitter node and the receiver node are time synchronized to apply Doppler corrections to said node's own motions relative to a stationary common inertial reference frame, wherein the stationary common inertial reference frame is known to the transmitter node and the receiver node prior to the transmitter node transmitting signals to the receiver node and prior to the receiver node receiving the signals from the transmitter node.

2. The system node of claim 1, wherein the system is a mobile ad-hoc network (MANET) comprising the transmitter node and the receiver node.

3. The system node of claim 1, wherein the transmitter node is configured to apply the Doppler corrections relative to the stationary common inertial reference frame for a plurality of azimuthal angles across a multi-pulse Doppler group such that each direction along one of the plurality of the azimuthal angles has a zero or near-zero Doppler time interval that would be known to the receiver node based on the time synchronization, wherein the receiver node is configured to apply the Doppler corrections relative to the stationary common inertial reference frame for the plurality of the azimuthal angles across the multi-pulse Doppler group, wherein the receiver node is configured to apply the Doppler corrections in an inverse fashion as compared to the transmitter node's application of the Doppler corrections, wherein the receiver node is further configured to receive a zero or near-zero Doppler pulse along a zero or near-zero Doppler path from the transmitter node to the receiver node within known time intervals.

4. The system node of claim 3, wherein the Doppler corrections are in both of the frequency domain and the time domain.

5. The system node of claim 3, wherein the zero or near-zero Doppler path is unknown to the transmitter node and the receiver node prior to transmission of the multi-pulse Doppler group.

6. The system node of claim 5, wherein the receiver node is further configured to coherently detect across relatively long correlation sequences.

7. The system node of claim 5, wherein with time corrected pulse-to-pulse, pulse-to-pulse Doppler dispersion is corrected.

8. The system node of claim 7, wherein, based at least on the corrected pulse-to-pulse Doppler dispersion, the receiver node has an increased sensitivity of signals from the transmitter node as compared to a sensitivity of signals when the receiver node has pulse-to-pulse Doppler dispersion.

9. The system node of claim 8, wherein, based at least on the corrected pulse-to-pulse Doppler dispersion, the receiver node is further configured for deep-noise detection.

10. The system node of claim 8, wherein the receiver node is further configured to correct Doppler time-error for subsequent pulses.

11. The system node of claim 10, wherein the receiver node is further configured to additively combine pulse-to-pulse correlation scores to further improve sensitivity of the signals from the transmitter node.

12. The system node of claim 1, wherein the stationary common inertial reference frame is a two-dimensional (2D) stationary common inertial reference frame.

13. The system node of claim 1, wherein the stationary common inertial reference frame is a three-dimensional (3D) stationary common inertial reference frame.

14. The system node of claim 1, wherein the at least one antenna element of the transmitter node comprises at least one of at least one directional antenna element or at least one omnidirectional antenna element, wherein the at least one antenna element of the receiver node comprises at least one of at least one directional antenna element or at least one omnidirectional antenna element.

15. A method, comprising:
time synchronizing each node of a transmitter node and a receiver node, wherein each node of the transmitter node and the receiver node comprises a communications interface including at least one antenna element, wherein each node of the transmitter node and the receiver node further comprises a controller operatively coupled to the communications interface, the controller including one or more processors;
based at least on the time synchronizing, applying, by the transmitter node, Doppler corrections to the transmitter node's own motions relative to a stationary common inertial reference frame; and
based at least on the time synchronizing, applying, by the receiver node, Doppler corrections to the receiver node's own motions relative to the stationary common inertial reference frame;
wherein the stationary common inertial reference frame is known to the transmitter node and the receiver node prior to the transmitter node transmitting signals to the receiver node and prior to the receiver node receiving the signals from the transmitter node.

\* \* \* \* \*